United States Patent
Dolwin

(10) Patent No.: US 7,142,525 B2
(45) Date of Patent: Nov. 28, 2006

(54) DATA TRANSMISSION SYSTEM

(75) Inventor: Anthony Craig Dolwin, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 678 days.

(21) Appl. No.: 10/293,325

(22) Filed: Nov. 14, 2002

(65) Prior Publication Data

US 2003/0092421 A1  May 15, 2003

(30) Foreign Application Priority Data

Nov. 14, 2001  (GB) ................... 0127340.8

(51) Int. Cl.
*H04Q 7/00* (2006.01)
(52) U.S. Cl. .................. 370/328; 370/310.2; 370/311; 370/332; 370/338; 455/428; 455/450; 455/452.1; 455/452.2
(58) Field of Classification Search ........... 370/395.21, 370/428, 429
See application file for complete search history.

(56) References Cited

U.S. PATENT DOCUMENTS

| 6,029,064 | A | | 2/2000 | Farris et al. | |
|---|---|---|---|---|---|
| 6,230,200 | B1 | * | 5/2001 | Forecast et al. | 709/226 |
| 6,469,991 | B1 | * | 10/2002 | Chuah | 370/329 |
| 6,744,757 | B1 | * | 6/2004 | Anandakumar et al. | 370/352 |
| 6,859,460 | B1 | * | 2/2005 | Chen | 370/412 |
| 6,885,987 | B1 | * | 4/2005 | Buchholz et al. | 704/228 |
| 2002/0075805 | A1 | * | 6/2002 | Gupta et al. | 370/235 |

FOREIGN PATENT DOCUMENTS

WO  WO 95/03679 A1  2/1995

* cited by examiner

*Primary Examiner*—Wellington Chin
*Assistant Examiner*—Raj Jain
(74) *Attorney, Agent, or Firm*—Oblon, Spivak, McClelland, Maier & Neustadt, P.C.

(57) ABSTRACT

A digital mobile phone network infrastructure includes a plurality of radio base stations in communication with a plurality of mobile communications devices over a radio interface. In a method according to the invention packetized streamed media data is buffered within the network infrastructure and this data is then sent to a mobile communications device when traffic across the radio interface is low. The data may be transmitted at a lower than usual quality of service. Preferably the mobile communications device buffers the streamed data until reception is complete before the data stream is played to a user. Aspects of the invention also include a mobile communications device and a streamed media data controller for implementing the method. The method allows more efficient use of a network capacity and in particular allows the provision of high quality multimedia bulletins to mobile phone users at times of peak loading.

29 Claims, 3 Drawing Sheets

DATA TRANSMISSION SYSTEM

FIELD OF THE INVENTION

This invention is generally concerned with the transmission of data over a digital mobile phone network, and in particular relates to improved apparatus and methods for the transmission of streamed media data over so-called 2.5G and 3G mobile phone networks.

BACKGROUND OF THE INVENTION

A typical digital mobile phone network is shown in FIG. 1 in which, broadly speaking, infrastructure elements above dashed line 10 are found in 2G phone networks and the elements below line 10 are the additional elements incorporated in 2.5G and 3G networks to handle packet data transmission. The basic structure of FIG. 1 is common to all digital mobile phone networks, but for convenience the network is labelled using mainly GSM terminology.

In FIG. 1 a radio mast 12 is coupled to a base station 14 which in turn is controlled by a base station controller 16. A mobile communications device 18 is shown in two-way communication with base station 14 across a radio or air interface 20, known as a Um interface in GSM and GPRS (General Packet Radio Service) networks and a Uu interface in cdma2000 and WCDMA networks. Typically at any one time a plurality of mobile devices 18 are attached to a given base station, which includes a plurality of radio transceivers to serve these devices.

Base station controller 16 is coupled, together with a plurality of other base station controllers (not shown) to a mobile switching centre (MSC) 22. A plurality of such MSCs are in turn coupled to a gateway MSC (GMSC) 24 which connects the mobile phone network to the public switched telephone network (PSTN) 26. A home location register (HLR) 28 and a visitor location register (VLR) 30 manage call routing and roaming and other systems (not shown) manage authentication, billing. An operation and maintenance centre (OMC) 29 collects the statistics from network infrastructure elements such as base stations and switches to provide network operators with a high level view of the network's performance. The OMC can be used, for example, to determine how much of the available capacity of the network or parts of the network is being used at different times of day.

The above described network infrastructure essentially manages circuit switched voice connections between a mobile communications device 18 and other mobile devices and/or PSTN 26. So-called 2.5G networks such as GPRS, and 3G networks, add packet data services to the circuit switched voice services. In broad terms a packet control unit (PCU) 32 is added to the base station controller 16 and this is connected to a packet data network such as Internet 38 by means of a hierarchical series of switches. In a GSM-based network these comprise a serving GPRS support node (SGSN) 34 and a gateway GPRS support node (GGSM) 36. It will be appreciated that both in the system of FIG. 1 and in the system described later the functionalities of elements within the network may reside on a single physical node or on separate physical nodes of the system.

In a 2.5G or 3G network mobile device 18 may provide more than a simple voice connection to another phone. For example mobile device 18 may additionally or alternatively provide access to video and/or multimedia data services, web browsing, email and other data services. Logically mobile device 18 may be considered to comprise a mobile terminal (incorporating a subscriber identity module (SIM) card) with a serial connection to terminal equipment such as a data processor or personal computer. Generally once the mobile device has attached to the network it is "always on" and user data can be transferred transparently between the device and an external data network, for example by means of standard AT commands at the mobile terminal-terminal equipment interface. Where a conventional mobile phone is employed for mobile device 18 a terminal adapter such as a GSM data card may be needed.

Third generation technology encompasses Wide-band Code Division Multiple Access (WCDMA) in Europe and Japan, cdma2000 in the USA, and Time Division Duplex CDMA in China. In a 3D network the base station controller 16 is known as a Radio Network Controller (RNC) and base station 14 is known as a Node B; the network as a whole is known as a UMTS (Universal Mobile Telecommunications System) network. Such networks are the subject of standards produced by the Third Generation Partnership Project (3GPP) and technical specifications for such networks, including TS 23.060 and TS 23.107 which are hereby incorporated by reference, can be found on the 3GPP website.

In a 3G system radio interface resources are shared dynamically between speech and data as a function of service load and operator preference. In addition the radio interface also carries signalling including control messages for managing the network and its resources. The demands on the network depend upon the demand for traffic made by an individual mobile station and the load imposed on the network by other traffic in the same and nearby cells. The packet data transmission has an associated quality service (QoS) profile which is negotiated with the network in accordance with the available radio resources. The network attempts to provide adequate resources to support the negotiated quality of service and the data transmission radio priority is determined based upon this.

In a 3G UMTS network (see 3G TS 23.107) four different QoS classes (or traffic classes) are proposed, conversational class, streaming class, interactive class and background class. The most significant distinction between these classes is the sensitivity of the traffic to any delays in the network. Thus the conversational class and streaming class data services provide a guaranteed bit rate and a guaranteed transfer delay and preserve the time relation between information entities of the stream or conversational pattern. The guaranteed bit rate guarantees delivery of a number of bits within a period of time. The guaranteed (maximum) transfer delay limits the time between requesting transfer of a service data unit or packet and its delivery, and is generally specified for one or more fixed service data unit sizes.

In a packet switched network different packets may take different routes to their destination and, depending upon other traffic within the network, may be delayed to a greater or lesser extent or even entirely lost. Circuit switched voice connections are also given priority over data connections at the radio interface and thus the number of voice calls can also affect the data traffic. The characteristics of packet switched data networks mean substantial spare capacity is needed to ensure that data packets carrying a payload of streamed media data, such as audio or video data, arrive in the right order and sufficiently regularly to provide smooth playback.

It can therefore be appreciated that the transmission of streamed media data in packets over 2.5G and 3G mobile phone networks presents a significant challenge, particularly when the network is operating close to capacity, as it frequently will be. Notwithstanding this public expectation for these networks are for the delivery of smooth, high-quality multimedia services.

U.S. Pat. No. 6,029,064 describes a mobile audio programme selection system in which a mobile phone user dials up a service when information is required and listens to an announcement in real time. However such a service is costly for the network operator to provide and for the user as such information is most likely to be required during peak traffic times. Furthermore the system is limited to information in an audio format.

There is therefore a need for improved methods and apparatus for delivering such services whilst maintaining adequate quality, particularly when the phone network is heavily loaded.

SUMMARY OF THE INVENTION

According to the present invention there is therefore provided a method of transmitting packetised streamed media data to a mobile communications device over a digital mobile phone network, the mobile phone network comprising, a network infrastructure including a plurality of radio base stations each for communicating with a plurality of said mobile communications devices over a radio interface, the method comprising, buffering said packetised streamed media data within said network infrastructure, identifying a time of low traffic across a said radio interface; and sending said packetised streamed media data to said mobile communications device at said time of low traffic.

The streamed media data may comprise video data, audio data, multimedia data or other streamed data for output to user in substantially real-time. The digital mobile phone network is preferably a 2.5G or 3G mobile phone network.

The time of low traffic may be identified by detecting when measured traffic at an interface falls below a threshold level or by analysing historical data to determine a period when low traffic is expected. The reference to the traffic going below a threshold level could in some systems, be described more accurately as available capacity in the system going above a certain threshold. In this context the exact threshold level determining what counts as low traffic is not particularly important providing the threshold level is set somewhere below the maximum traffic capacity so that "spare" capacity or capacity available for other higher priority data transmissions may be utilised.

Thus the threshold may, for example, be defined in terms of a specified reduction in traffic below an average (mean, median or mode) level rather than as a fixed threshold value, either for a single radio interface or for radio interfaces of a plurality of base stations. Similarly the threshold may be defined in terms of a trough in a traffic-time curve. Alternatively the threshold for low traffic may define a traffic level sufficiently below a maximum traffic capacity to provide capacity for transmission of the streamed media data with a non-streamed or background priority.

The radio interface at which the traffic is measured may be the radio interface for the mobile communications device to which the streamed media data is to be transmitted or it may be another radio interface within the system, although preferably one which is representative of the interface for the device to which the streamed data is to be transmitted. The traffic level will generally be measured by the network infrastructure but in embodiments of the method the traffic level may be measured by the mobile communications device. The measured or historical traffic may comprise a traffic statistic representing the combined traffic across a plurality of radio interfaces. Account may also be taken of the direction of radio traffic, that is the level of traffic from or to the base station may be measured.

The time of low traffic may additionally or alternatively be identified pseudo-automatically by the network infrastructure, by selecting a lower quality of service than would be normal for streamed traffic. In this way the data packets may be given a relatively lower priority with the effect that, in some circumstances, the packets are sent as essentially a background task.

The transmission of the packetised streamed media data during periods of low usage of a wireless communications channel helps to optimise system resources and allows service providers to make the best use of available Erlangs. By not sending the streamed media data in real-time the average data rate is reduced, and by identifying a time of low radio interface traffic, such as late evening or when the instantaneous interface loading is determined to be small (i.e. opportunity driven) improved use can be made of the available network capacity. Thus, for example, multimedia information bulletins can be provided at times of peak network loading at very substantially reduced costs.

Preferably the mobile communications device buffers the streamed media data before decoding it. This allows a streamed media data item, such as a multimedia information bulletin, to be reconstructed using less memory than would otherwise be the case. Thus preferably the method includes detecting when reception of the streamed media data by the mobile communications device is complete.

In a preferred embodiment a period of reduced information content or "discontinuous transmission" in the streamed media data is detected and a message is inserted to indicate this. Preferably the message replaces the portion of the streamed media data having reduced information content with data indicating when streamed media data playing is to restart. Thus, for example, a period of silence or for video data, a period with no motion, may be replaced with a discontinuous transmission message indicating when audio or video data is to restart or indicating the duration of the period of reduced information content. This message can then be detected by the mobile communications device and interpreted accordingly, for example, to replace the message with an appropriate number of null or empty streamed media data frames. In other words the method preferably includes filtering to remove discontinuous transmission portions from the streamed media data.

In one embodiment of the method data from a plurality of sources is collated and converted into one or more common streamed media data formats suitable for the mobile communications device. Thus, for example, one or more source codecs may be provided, for example at a remote location on the Internet, to batch process multimedia data. Using such a pool of source codecs on the Internet an information correlator may select and gather data in a large range of formats even where the mobile communications device or terminal is provided with only a limited number of decoders. Thus by converting the collated data into a (common) streamed media data format the complexity of the mobile communications device or terminal may be reduced whilst maintaining the system flexibility and providing for future enhancement of the services offered to a user.

In another aspect the invention provides a mobile communications device for receiving streamed media data over a packet data channel of a digital mobile phone network, the mobile communications device comprising, an instruction memory storing processor implementable instructions; and a processor coupled to the instruction memory for implementing the instructions, the instructions comprising instructions to, receive data packets comprising streamed media data over a time period longer than a play time of said streamed media data, buffer streamed media data from said data packets within said mobile communications device, detect completion of said reception of said packets of streamed media data; and play said streamed media data to a user of said mobile communications device.

As the streamed media data packets are received over a time period longer than the video, audio, or multimedia play time of the streamed media data within the packets the streamed media data is, in effect, trickle fed to the mobile communications device as a background task. This allows a lower quality of service to be used for the data packets than that which would normally be required by such streamed media data. For example the mobile communications device may use a quality of service for transmission of the streamed media data which does not guarantee a bit rate and/or a transfer delay for the data.

In a preferred embodiment the mobile communications device is arranged to detect a discontinuous transmission message and to play the streamed media data with data, such as empty frames, inserted for a discontinuity period. The discontinuity period may be read from the message directly where the message specifies a discontinuity duration or may be determined from the message where the message specifies, for example, a time when playing of the streamed media data is to restart. Rather than the discontinuous transmission message being detected and replaced with empty frames, the inserted data may comprise, in embodiments, other data such as interpolated data.

In a further aspect the invention provides a streamed media data controller for sending packetised streamed media data over a radio interface of a digital mobile phone network to a mobile communications device, the streamed media data controller comprising, a data buffer; an instruction memory storing processor implementable instructions; and a processor coupled to the data buffer and to the instruction memory for implementing the instructions, the instructions comprising instructions to, receive said packetised streamed media data; store said received packetised streamed media data in said data buffer; identify a time of low traffic on said radio interface; and transmit said packetised streamed media data stored in said data buffer to said mobile communications device at said time of low traffic.

In a preferred embodiment the streamed media data controller includes an information collator which may either be co-located with the data controller or separately located at one or a plurality of a remote networked locations. The information collator preferably comprises one or more source codecs to collate data from a plurality of sources and convert the collated data into one or more streamed media data formats. In one embodiment the information collator comprises one or more intelligent agents located on the Internet to search for video and audio data in response to a user request. By supplying a pool of source codecs on the Internet the information correlator may select information in a large range of different formats for input to the collator whilst providing for a user mobile communications device or terminal having only a limited number of decoders. This reduces the complexity within the terminal and helps to maintain flexibility of the system and scope for system upgrades.

In a related aspect the invention also provides an information collator for use with the above-described streamed media data controller.

The invention also provides a method and a streamed media data controller for transmitting packetised streamed media data from a mobile communications device, for example to another mobile communications device or to an Internet terminal The invention additionally contemplates a mobile communication system comprising the streamed media data controller and a user mobile communications device or terminal.

The present invention can be embodied in computer program code implementable, as is well known to those skilled in the art, on one or more processors. The computer code may be provided on any convenient carrier medium, such as an optical or electrical signal carrier, hard or floppy disk, programmed memory or a CD-ROM or DVD-ROM.

In a further aspect the invention provides a method of transmitting streamed media data over a packet-switched network from a sending device to a receiving device, the method comprising, buffering said streamed media data within said sending device, identifying a time of low traffic within said network, sending said streamed media data as data packets over said network from said sending device to said receiving device at said time of low traffic; and buffering said streamed media data within said receiving device.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

Figure 2:
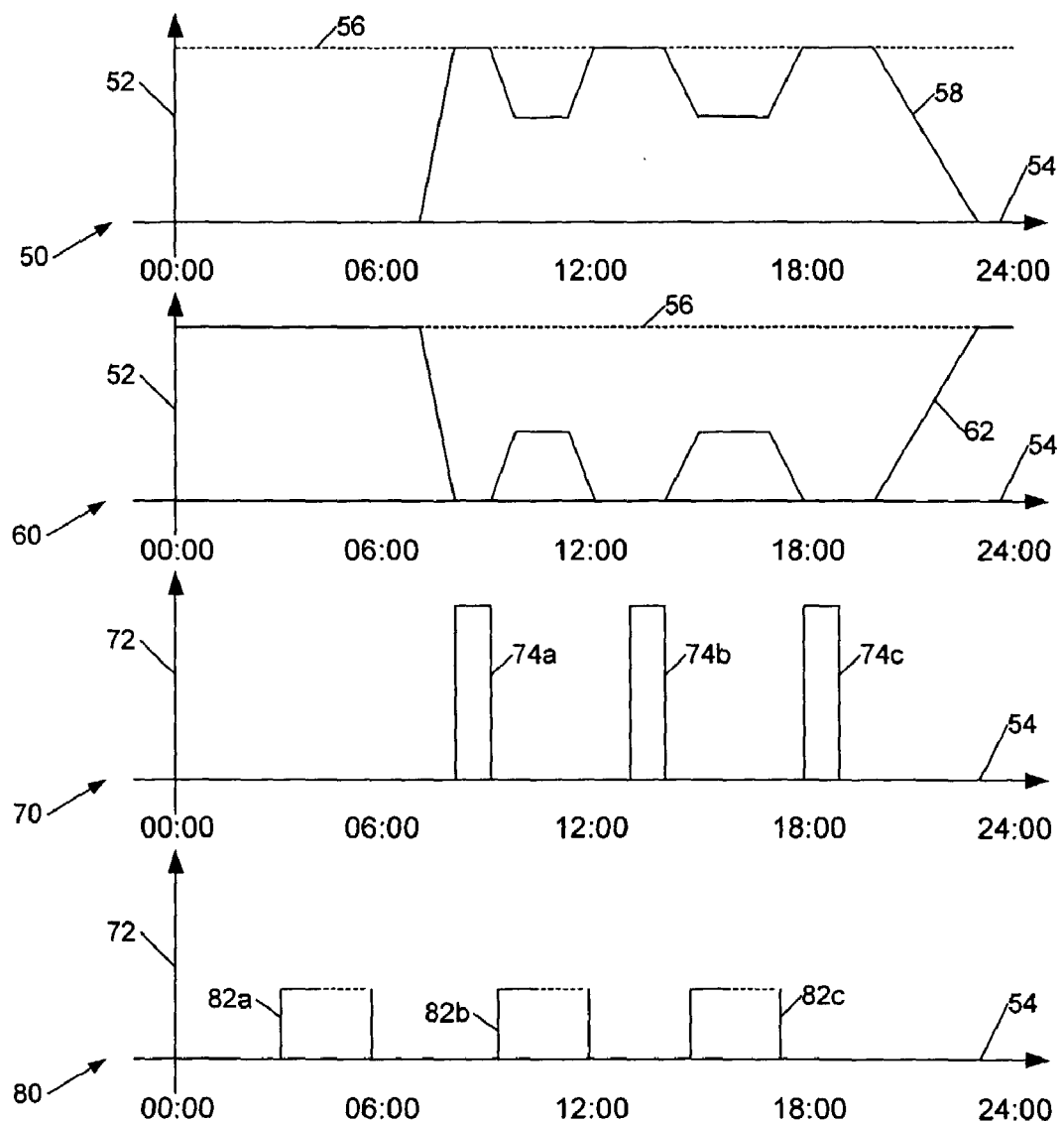
FIG. 2 shows a series of graphs illustrating transmission of streamed media data during periods of low network traffic.

Referring first to FIG. 2, this shows a series of graphs 50, 60, 70, 80 illustrating the broad concept of a method of transmitting streamed media data according to an embodiment of the present invention. Each of the four graphs has a time axis 54, illustratively running over a period of 24 hours, and starting at midnight. Graphs 50 and 60 both have a y-axis 52 showing average network capacity on a radio interface; dashed line 56 illustrates a maximum capacity of the radio interface. Graphs 70 and 80 each have a traffic demand y-axis 72.

Graph 50 shows that in a typical day the network traffic 58 is very low between around midnight and 6 am and varies during the day with peaks in the morning, at lunch time, and in the early evening. Graphs 60 shows network capacity 62 and is the inverse of graph 50. Graph 70 shows, for the purposes of illustration, demand peaks 74a, 74b, 74c in the morning, at lunch time, and in the evening for the transmission of streamed media data services, to provide news bulletins and the like. These demand peaks, which for streamed data impose relatively strict constraints on bit rate and transfer time, tend to occur when the available network capacity is smallest.

In graph 80 the demand profile has been adjusted to approximately match the network capacity profile. This has been done by transmitting the streamed data with a lower priority than would normally be accorded to such streamed data, and by transmitting the data in advance of the time when it is actually required, preferably sufficiently in advance to substantially guarantee that all the data has been received by the time it is required. Thus in graph 80 the three demand peaks 74a, b, c have been replaced by three earlier peaks 82a, b, c, each having (preferably) a lower maximum demand for capacity because the data is no longer being transmitted with a streaming class priority or quality of service. The precise duration of the peaks 82 is however to some extent uncertain as this will depend upon the level of other traffic within the network, the bit error rate and hence the number of frames which must be retransmitted, and other factors.

Figure 1:
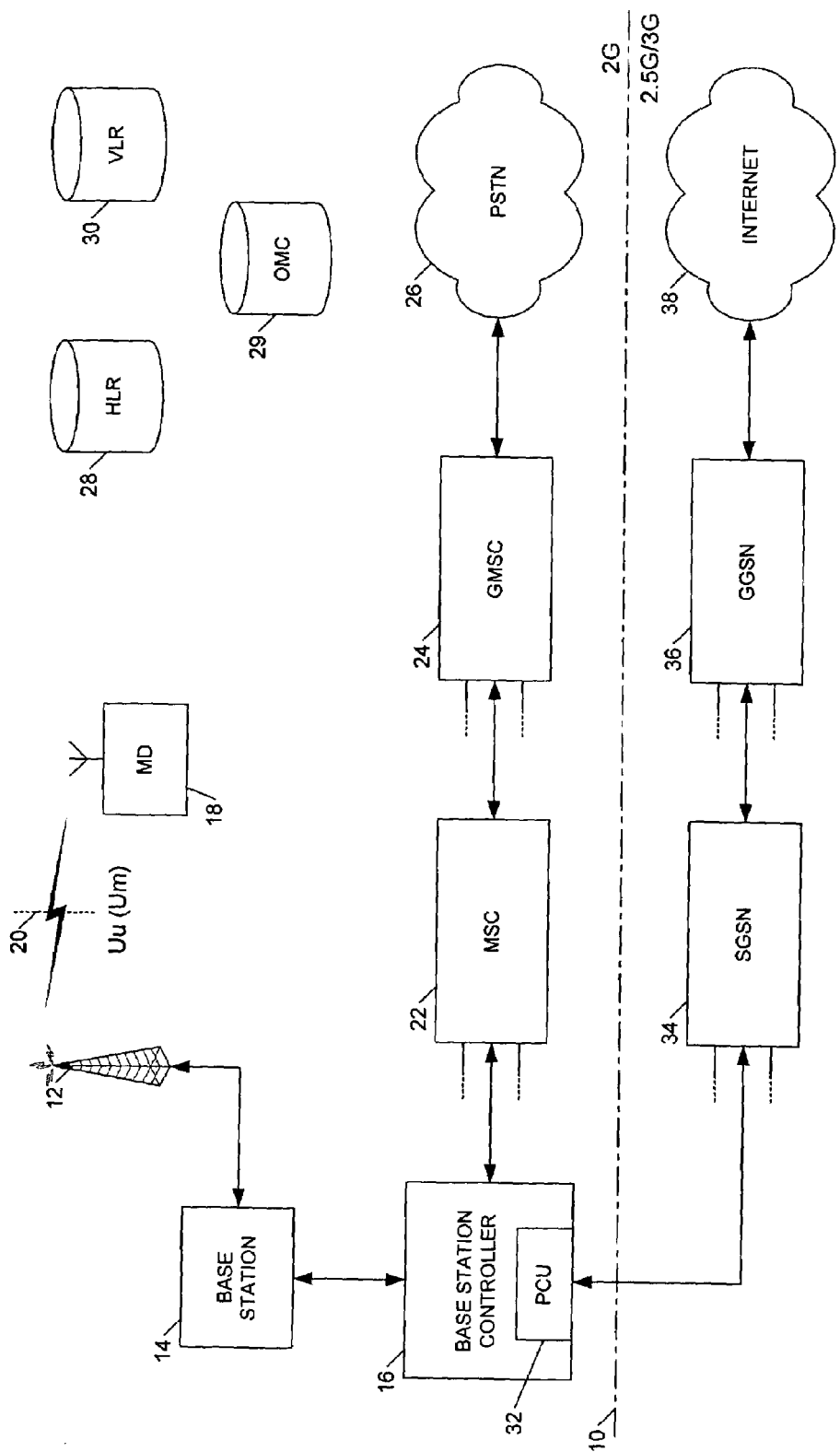
FIG. 1 shows elements of a third generation mobile phone network.
Figure 3:
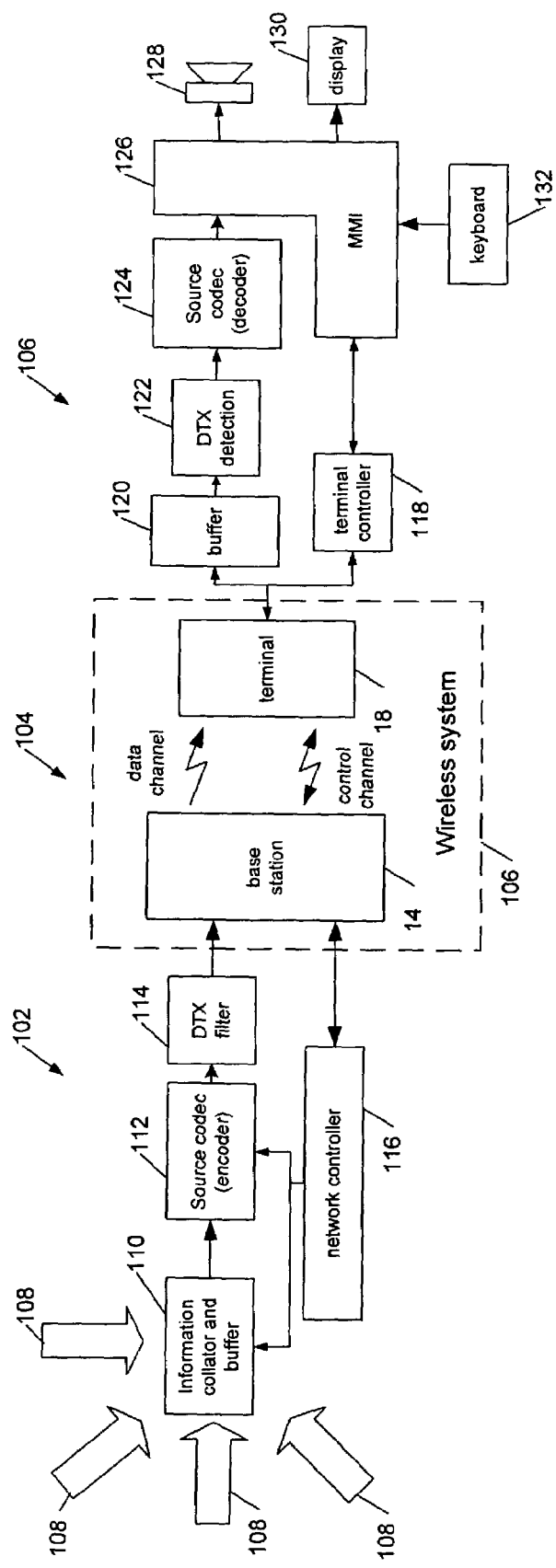
FIG. 3 shows a streamed media data transmission system to implement the concept of FIG. 2.

Turning now to FIG. 3, this shows a system 100 for implementing a streamed media data transmission method according to an embodiment of the invention. The system 100 comprises legacy wireless system components 104 comprising a base station 14 and a terminal 18, and additional network infrastructure components 102 and terminal-end components 106. The skilled person will appreciate that the additional network infrastructure components 102 may comprise additional software running on existing network infrastructure elements, rather than additional physical devices. Furthermore some of these components may be separate from the network infrastructure per se, for example comprising a terminal running software connected to Internet 38 of FIG. 1. The elements 106 connected to terminal 18 may likewise simply comprise additional software loaded into a mobile communications device.

The additional network side components comprise an information collator 110, a source codec 112 and a network controller 116 to control the information collator and source codec. The output of codec 112 is passed through a DTX (Discontinuous Transmission) filter 114 which provides filtered data to base station 14.

On the user side terminal 18 is coupled to a terminal controller 118 which in turn is coupled to a Man-Machine Interface (MMI) 126. The MMI 126 provides an audio output, shown as speaker 128, a visual display 130, and user input means, shown as keyboard 132. A buffer 120 is provided to receive data from terminal 18. A DTX detector 122 is coupled to buffer 120 to read data from the buffer and to reconstruct data filtered out by DTX filter 114, providing a data stream to a source decoder 124. Source decoder 124 decodes streamed data into audio and/or video data streams which are provided to MMI 126, and thence to the user by means of speaker 128 and/or display 130.

In use a user inputs a request for a type or category of information into the mobile communications device terminal 18 using keyboard 132 and MMI 126. This request is transmitted to network controller 116 by terminal controller 118 via base station 14. The request may include broadcast time information such as a time by when the information bulletin is required, or information specifying regular, for example hourly, bulletins. The network controller 116 then communicates with information collator 110 to pass on the request for information.

The information collator 110 assembles information from a plurality of sources, schematically illustrated by arrows 108, in response to the received request. The information collator may operate in the manner of a web search engine but preferably the collator comprises one or more intelligent agents, located on the Internet, to search for audio and video data accessible via the Internet that meets the user's requirements. The relevant information is assembled from the disparate sources and passed to source encoder 112 for format conversion and data compression. The information collator may additionally or alternatively search networks other than the Internet or World Wide Web, such as a local or wide area network, intranet or extranet.

Since the data collected by the information collator may be in a plurality of different formats source encoder 112 is preferably capable of converting from a plurality of different formats to a common format for the user terminal. Preferably the source encoder is also located on the Internet for flexibility and scalability. The source encoder 112 may in practice comprise a plurality of separate encoders, and in embodiments these may be remote from information collator 110.

The compressed data from source encoder 112 is passed to DTX filter 114, which removes empty frames and replaces these with a message indicating a duration of non-transmission. During certain scenarios, for example where a speaker is not talking or where a picture is not changing, the source encoder 112 need not transmit any further data until the input source data changes. Arrangements to implement such discontinuous transmission are a well-known feature of real-time codecs, in which the transmission of data is stopped during these periods. However where the data is processed off-line, as in embodiments of the invention, the decoder must be informed of the duration of this non-transmission, and this function is performed by the DTX filter 114. Although DTX filter 114 is shown following source encoder 112 the DTX filter may be combined with the source encoder or may precede the source encoder to operate on uncompressed data.

Data from the DTX filter 114 is forwarded into the existing wireless network infrastructure, shown by wireless system 104, with a request for transmission at a quality of service (QoS) that should allow transmission of all the data selected for providing to the user either by a required time or within a defined time interval. The wireless system 104 then transmits data packets containing the streamed media data to terminal 18 during periods of low usage of the wireless system. Additionally or alternatively the network controller may monitor levels of network traffic either in pseudo real-time or using historical data, for example from OMC 29 of FIG. 1, and then determine when to forward the data into the network for transmission based upon the actual or predicted traffic level.

At the user end buffer 120 stores the received data until the original message has been received in its entirety. This point can be detected, for example, by an end of message flag read by buffer 120 or terminal controller 118. Once the entire message has been received the audio and/or video data stream is reconstructed and the message is replayed to the user.

The DTX detector 122 reads received data from buffer 120 and detects occurrences of the discontinuous transmission message and replaces these with the required number of empty data frames. The source decoder 124 is then used in a conventional way to decode the data stream, providing an output to MMI 126 whereby the decoded audio and/or video data can be played to the user through speaker 128 and/or display 130. Buffer 120 is preferably located prior to decoder 124, for more efficient use of the wireless channel and to reduce the size of the data buffer but, in other embodiments, buffer 120 may be located after decoder 124.

Many of the information services desired by users of mobile terminals are only required at relatively low frequencies, such as an hourly or daily bulletin. However such services are best presented to users of small handsets in a high quality audio, video, or multimedia format. To allow such a service to be supplied at minimal cost to the user the communication channel should be used as efficiently as possible. The above-described system facilitates this by allowing a packet-based channel to be used to transmit information only when capacity is available, the one or more receiving terminals buffering the data and reconstructing the message before playing the bulletin at the requested time.

In one example of the system's application a user inputs a request for news on a range of subjects, to be presented at the beginning of each day. Thus MMI 126 inputs keywords defining the relevant subjects and data defining the preferred approximate duration and time of the bulletin, and a bulletin format such as speech, speech plus video, text, and the like. The defined keywords are passed by the system to information collator 110 which each day searches the Internet for suitable material for the next day's bulletin. Once this information has been gathered it is sent to one or more suitable source encoders to convert the data into a format readable by the user's terminal. Thus, for example, audio PCM (Pulse Code Modulation) data and MP3 (MPEG audio layer 3) data may be converted to ITU standard G729a compressed speech and/or text data may be converted to speech and then to G720a compressed speech.

One or more of the information collator 110, the source encoder 112, and the DTX filter 114 preferably includes a buffer to temporarily store the collected data (in either an uncompressed or a compressed format) and, once the data has been collected and buffered, the wireless system 104 transmits the streamed media data to the mobile communications device terminal 18 during periods of low traffic loading. Terminal 18 reconstructs the entire bulletin in its internal memory buffer 120 and, when the reconstruction is complete, the user is informed, allowing the user to play the bulletin to listen to the speech and/or view the video. The source decoder 124 in the terminal thus runs in real time to decode the data from buffer 120 and DTX detector 122.

In another, related embodiment after passing data to base station 14 with a low priority for transmission network controller 116 may periodically check to see whether the data is being transmitted at a required rate to achieve complete transmission within a specified time limit. If this rate is not being achieved the control unit may increase the priority of the transmission.

Although the described embodiments are intended for the transmission of multimedia bulletins to a user's mobile communications device, the invention may also be employed to send streamed media data from a mobile communications device over a digital mobile phone network, for example to the Internet or to other mobile users. Similarly the technique of identifying periods of low traffic may also be employed in other packet-based networks in which data is not necessarily transmitted across a wireless link such as, for example, ATM networks. In a corresponding manner the technique may also be extended to data other than streamed media data where preservation of a real-time relationship between the data packets is important and, preferably, where the traffic is non-bursty. No doubt other effective alternatives will occur to the skilled person and the invention is not limited to the described embodiments.

I claim:

1. A method of transmitting packetised streamed media data to a mobile communications device over a digital mobile phone network, the mobile phone network comprising: a network infrastructure including a plurality of radio base stations each for communicating with a plurality of said mobile communications devices over a radio interface, the method comprising: buffering said packetised streamed media data within said network infrastructure; identifying a time of low traffic across said radio interface; and sending said packetised streamed media data to said mobile communications device at said time of low traffic; and detecting a period of reduced information content in said streamed media data; and inserting a message indicating said period of reduced information content into said streamed media data.

2. A method according to claim 1 further comprising:
buffering said streamed media data within said mobile communications device; and
detecting when reception of said streamed media data by said mobile communications device is complete.

3. A method according to claim 1 further comprising:
measuring the traffic across said radio interface;
detecting when said measured traffic is below a threshold level; and
sending said streamed media data responsive to said detecting of when traffic is below the threshold level.

4. A method according to claim 1 wherein said identifying comprises:
collecting historical data for traffic across one or more said radio interfaces; and
analysing said historical data to determine periods of expected low traffic across said one or more radio interfaces.

5. A method according to claim 1 further comprising selecting a quality of service for sending said streamed media data, said selected quality of service being lower than a quality of service defined within said network for use with streamed data.

6. A method according to claim 1 further comprising:
detecting a period of reduced information content in said streamed media data; and
inserting a message indicating said period of reduced information content into said streamed media data.

7. A method according to claim 1 further comprising:
collating data from a plurality of sources; and
converting said collated data into a streamed media data format.

8. A mobile communications device for receiving streamed media data over a packet data channel of a digital mobile phone network, the mobile communications device comprising:
an instruction memory storing processor implementable instructions; and
a processor coupled to the instruction memory for implementing the instructions, the instructions comprising instructions to:
receive data packets comprising streamed media data over a time period longer than a play time of said streamed media data;
buffer streamed media data from said data packets within said mobile communications device;
detect completion of said reception of said packets of streamed media data; and
play said streamed media data to a user of said mobile communications device.

9. A mobile communications device as claimed in claim 8 wherein said instructions further comprise instructions to:
detect a discontinuous transmission message within said data packets;
read the message to determine a transmission discontinuity period; and
play said streamed media data with data inserted for said discontinuity period.

10. A mobile communications device according to claim 8 wherein said instructions further comprise instructions to:

determine a quality of service for said data packets which is lower than a quality of service defined within said network for use with streamed data.

11. A mobile communications device according to claim 8 wherein said instructions further comprise instructions to: determine a quality of service for said data packets which does not guarantee a bit rate for said streamed media data.

12. A mobile communications device according to claim 8 wherein said instructions further comprise instructions to: determine a quality of service for said data packets which does not guarantee a transfer delay for said streamed media data.

13. A mobile communications device according to claim 8 wherein said instructions further comprise instructions to: input a request for information for delivery via the mobile phone network; transmit the request for information to an information provider; and wherein said data packets are received via the digital mobile phone network in response to said request for information.

14. A carrier medium carrying the processor implementable instructions of claim 8.

15. A streamed media data controller for sending packetised streamed media data over a radio interface of a digital mobile phone network to a mobile communications device, the streamed media data controller comprising: a data buffer; an instruction memory storing processor implementable instructions; and a processor coupled to the data buffer and to the instruction memory for implementing the instructions, the instructions comprising instructions to: receive said packetised streamed media data; store said received packetised streamed media data in said data buffer; identify a time of low traffic on said radio interface; and transmit said packetised streamed media data stored in said data buffer to said mobile communications device at said time of low traffic; and detecting a period of reduced information content in said streamed media data; and inserting a message indicating said period of reduced information content into said streamed media data.

16. A streamed media data controller as claimed in claim 15 further comprising an information collator to: collate data from a plurality of sources; and convert said collated data into a streamed media data format.

17. A streamed media data controller as claimed in claim 16 wherein said information collator further comprises: means to receive a request for information for delivery in said streamed media data; and means to search for and retrieve data relevant to said request for collation.

18. A streamed media data controller according to claim 16 wherein said information collator comprises a plurality of codecs.

19. A streamed media data controller according to claim 16 wherein said information collators is configured to batch process said collated data.

20. A streamed media data controller as claimed in claim 15 wherein said instructions further comprise instructions to: measure the traffic across said radio interface; detect when said measured traffic is below a threshold level; and transmit said streamed media data responsive to detection of traffic below the threshold level.

21. A streamed media data controller according to claim 15 wherein said instructions further comprise instructions to: collect historical data for traffic across one or more said radio interfaces; and analyse said historical data to determine periods of expected low traffic across said one or more radio interfaces.

22. A streamed media data controller claim 15 wherein said instructions further comprise instructions to: select a quality of service for sending said streamed media data, said selected quality of service being lower than a quality of service defined within said network for use with streamed data.

23. A streamed media data controller according to claim 15 wherein said instructions further comprise instructions to: detect a period of reduced information content in said streamed media data; and insert a message indicating said period of reduced information content into said streamed media data.

24. An information collator for the streamed media data controller claim 16.

25. A carrier medium carrying the processor implementable instructions of claim 15.

26. A method of transmitting packetised streamed media data from a mobile communications device over a digital mobile phone network, the mobile phone network comprising: a network infrastructure including a plurality of radio base stations each for communicating with a plurality of said mobile communications devices over a radio interface, the method comprising: buffering said packetised streamed media data within said mobile communications device identifying a time of low traffic across said radio interface; and sending said packetised streamed media data from said mobile communications device at said time of low traffic; and detecting a period of reduced information content in said streamed media data; and inserting a message indicating said period of reduced information content into said streamed media data.

27. A streamed media data controller for sending packetised streamed media data over a radio interface of a digital mobile phone network from a mobile communications device, the streamed media data controller comprising: a data buffer; an instruction memory storing processor implementable instructions; and a processor coupled to the data buffer and to the instruction memory for implementing the instructions, the instructions comprising instructions to: receive said packetised streamed media data; store said received packetised streamed media data in said data buffer', identify a time of low traffic on said radio interface', and transmit said packetised streamed media data stored in said data buffer from said mobile communications device at said time of low traffic and detecting a period of reduced information content in said streamed media data; and inserting a message indicating said period of reduced information content into said streamed media data.

28. A carrier medium carrying the processor implementable instruction of claim 27.

29. A method of transmitting streamed media data over a packet-switched network from a sending device to a receiving device, the method comprising: buffering said streamed media data within said sending device; identifying a time of low traffic within said network; sending said streamed media data as data packets over said network from said sending device to said receiving device at said time of low traffic; and buffering said streamed media data within said receiving device; and detecting a period of reduced information content in said streamed media data; and inserting a message indicating said period of reduced information content into said streamed media data.

* * * * *